United States Patent [19]

Grenier

[11] 4,048,501
[45] Sept. 13, 1977

[54] METHOD AND APPARATUS FOR DETERMINING THE CONDITION OF A BIOLOGICAL SPECIMEN

[75] Inventor: Raymond P. Grenier, Wilmington, Mass.

[73] Assignee: Baird-Atomic, Inc., Bedford, Mass.

[21] Appl. No.: 649,071

[22] Filed: Jan. 14, 1976

[51] Int. Cl.² .............................................. G01T 1/20
[52] U.S. Cl. ................................ 250/367; 250/363 S; 250/366
[58] Field of Search ..................... 250/367, 363 S, 366

[56] References Cited
U.S. PATENT DOCUMENTS

| | | | |
|---|---|---|---|
| 3,717,762 | 2/1973 | Grenier | 250/363 S |
| 3,749,916 | 7/1973 | Thomas | 250/328 |
| 3,777,142 | 12/1973 | Grenier | 250/363 S |
| 3,777,161 | 12/1973 | Lee | 250/367 |
| 3,860,822 | 1/1975 | Owens | 250/363 S |

*Primary Examiner*—Harold A. Dixon
*Attorney, Agent, or Firm*—Morse, Altman, Oates & Bello

[57] ABSTRACT

A computer controlled high resolution radioactivity distribution detection system is provided for sensing radioactive events in a biological specimen. The system includes a rotating disc memory which contains instructional data for controlling the computer. Radiation emitted from a subject positioned on a programmable XY platform is directed through a collimator and is detected by means of an array of sensing devices and front end electronics. The detected radioactive events are temporarily held in a buffer memory under control of the computer for storage. The temporarily stored data is fed via the computer to a disc memory for long term storage, a disc controller constitutes an interface to the disc memory. The stored data is then applied to a display via computer for presentation.

9 Claims, 7 Drawing Figures

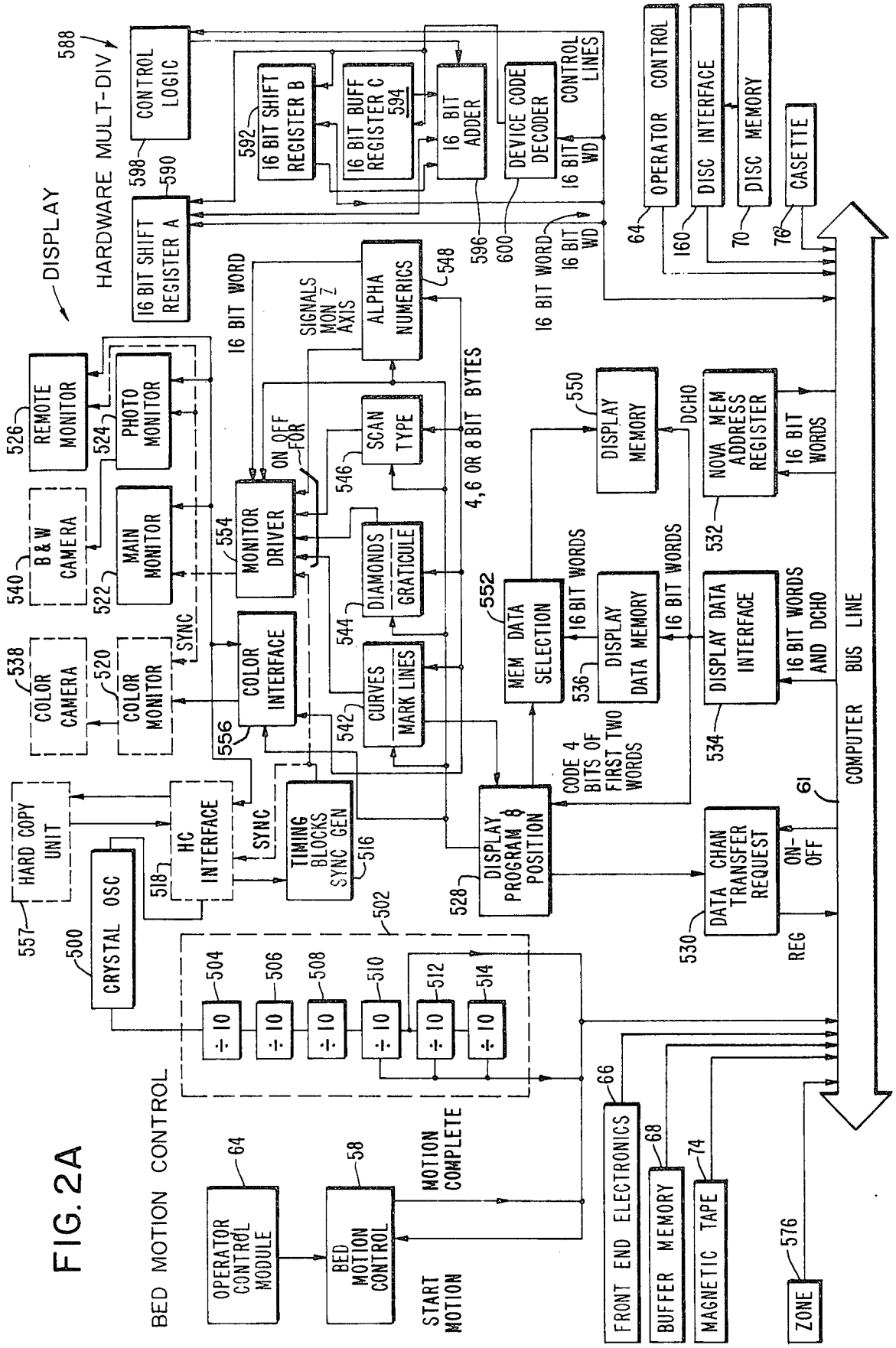

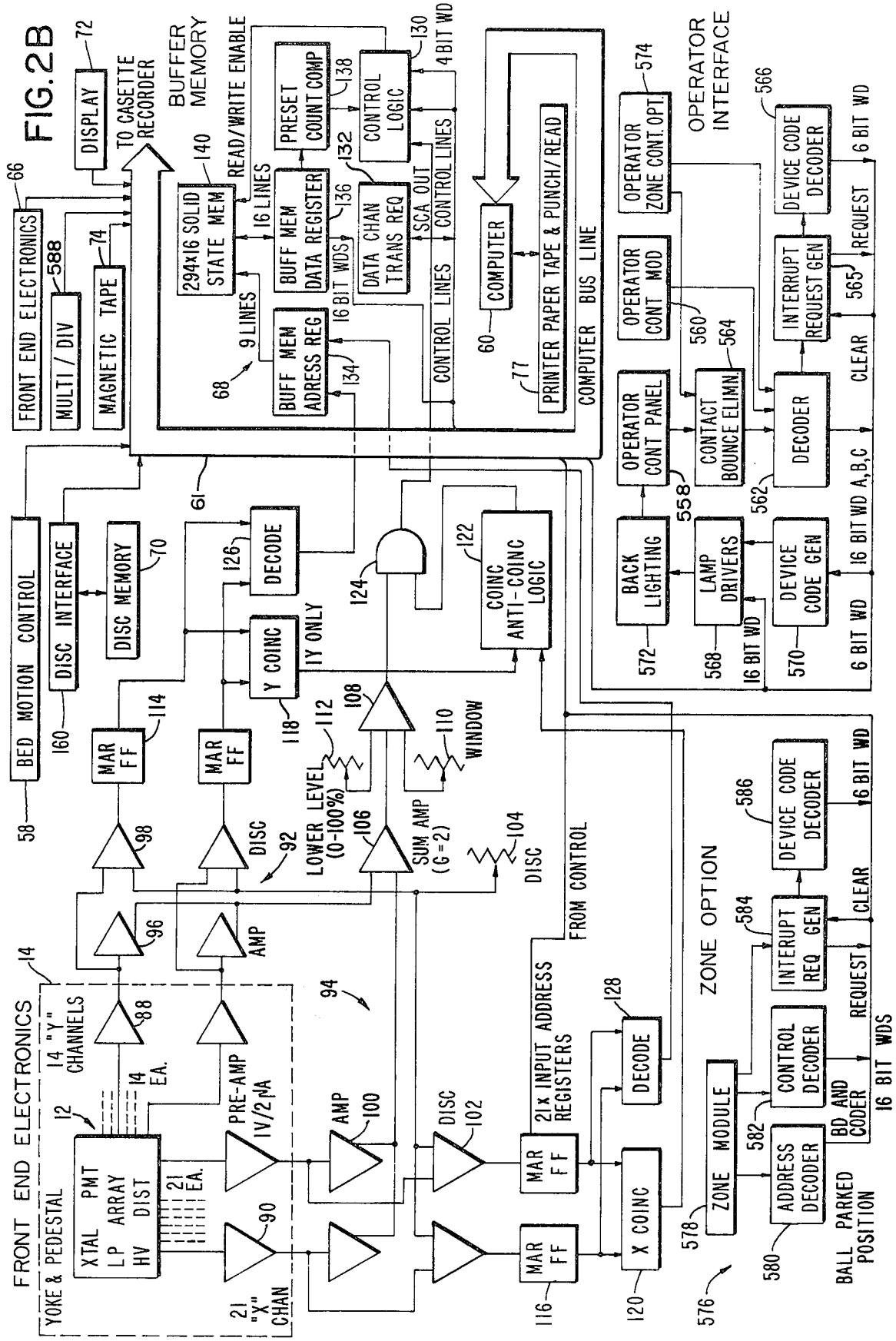

METHOD AND APPARATUS FOR DETERMINING THE CONDITION OF A BIOLOGICAL SPECIMEN

BACKGROUND OF THE INVENTION

1. Field of Invention

The present invention relates to detection systems, and more particularly, is directed towards a computer controlled high resolution radioactivity distribution detection system and a method for determining the conditions of a biological specimen.

2. Description of the Prior Art

Various types of radioactivity distribution detection systems have become known in the art for determining the location of radioaction material injected in diagnostic amounts into a human body or the like. Due to moderate data sampling rates, such systems have had varying degrees of success. A need has arisen for improvements in high resolution radioactivity detection systems.

SUMMARY OF THE INVENTION

It is an object of the present invention to provide a computer controlled radioactivity detection system and a method employing high counting rates in dynamic function studies and high spatial resolution in static imaging studies for determining the conditions of a biological specimen. The present invention is characterized by a rotating disc memory which stores both instructions for controlling the computer and detected data for further processing. A disc controller constitutes an interface between the rotating disc and the computer. Radioactive events emitted from a subject positioned on a movable XY table are sensed by a multi-crystal array and are transmitted through an assemblage of light pipes to a plurality of photomultipliers for detection. The detected events are processed in a front end electronics assembly and are applied to a buffer memory in digital form. The detected events are accumulated in the buffer memory and then fed to the rotating disc memory via the computer for storage. The stored data is transmitted via the computer to a display for presentation.

Another object of the invention is to provide a method for determining the conditions of a biological specimen defined by accumulated raw data of the detected events. The accumulated raw data, which is stored in the rotating disc memory, is applied to the computer for generation of a smooth data curve. Upon instructions from the rotating disc memory, inflection points of the smooth curve are determined and transposed to the raw data curve. Then, a new raw data curve is generated by linear extrapolation of the rising side of the raw data curve and by exponential extrapolation of the falling side of the raw curve. Data defining the conditions of the biological specimen are generated by the computer by reduction of the new raw data curve representing the accumulated raw data as a function of the smooth curve inflection points.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIGS. 2A, 2B and 2C are detailed block and schematic diagrams of the system of FIG. 1.

DETAILED DESCRIPTION OF THE PREFERRED EMBODIMENTS

Generally, the invention is characterized by a computer controlled radioactivity distribution detection system for generating data defining the conditions of a biological specimen following administration of a diagnostic amount of radioactive material. The invention includes a rotating disc memory which contains instructional data for controlling operation of the computer and which is operative to store accumulated data constituting detected radioactive events. A computer bus defines an interconnecting link among the various assemblies of the system, data being transferred from one assembly to another assembly via the computer. As hereinafter described, the interrelationships among the computer, rotating disc memory and other assemblies of the system provide unique measurement capabilities, high detection probability, distinct uniformity and clarity in reproduction characteristics, and high resolution in the presented data.

Figure 1:
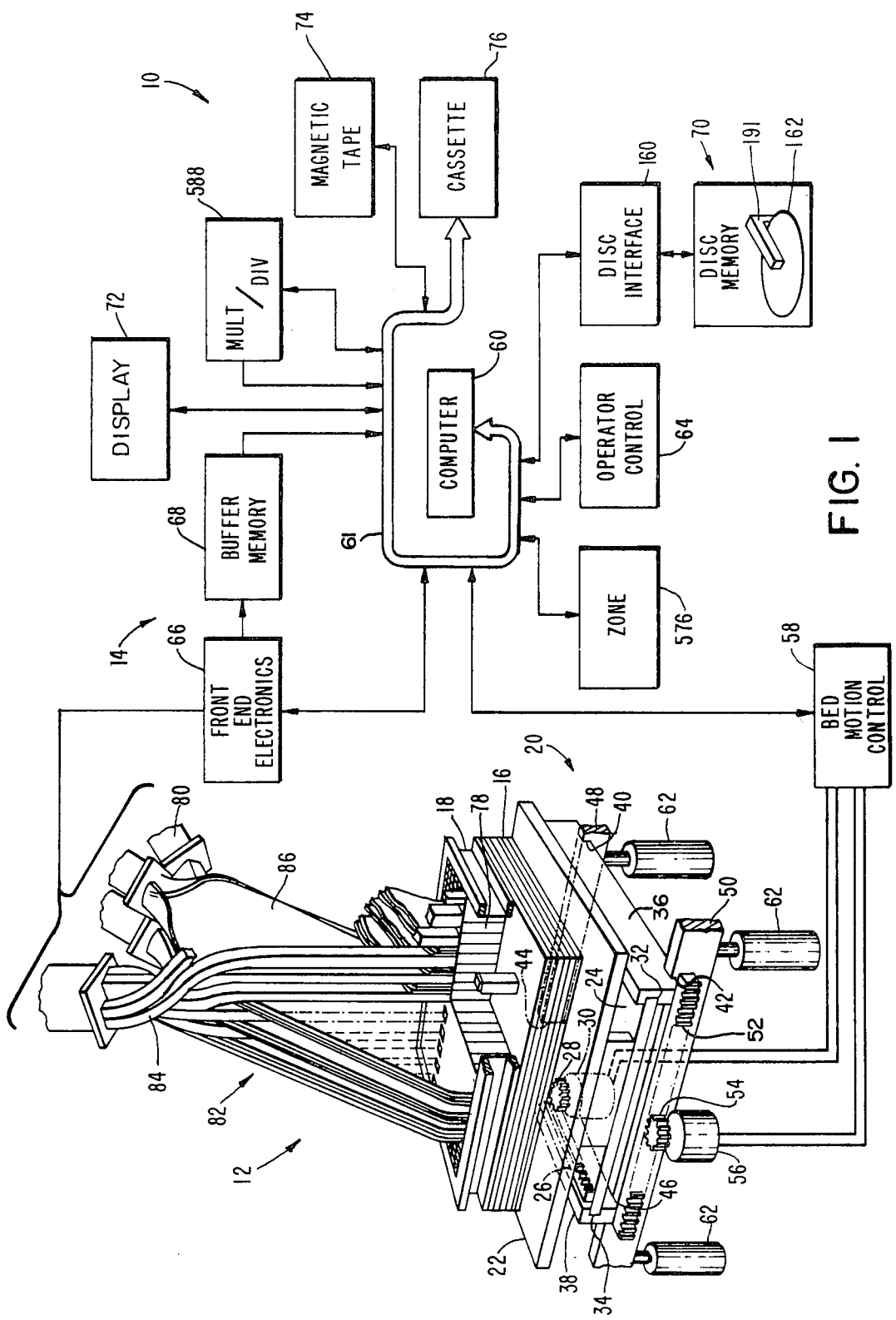
FIG. 1 is a block and schematic diagram of a system embodying the invention.

Referring now to the drawings, particularly FIG. 1, there is shown a computer controller radioactivity distribution detection system 10 embodying the present invention. System 10 comprises a detector assembly 12 and processing electronics 14. Detector assembly 12 includes a collimator 16 and an array 18 of individual scintillators. In the illustrated embodiment, collimator 16 is a multi-plane focused collimator characterized by at least two different focal lengths. A subject under diagnosis (not shown) is positioned on a programmable XY bed 20 which is in spaced relationship to detector assembly 12, a section of the subject under diagnosis being in registration with collimator 16.

Programmable XY bed 20 includes a platform 22 which is mounted to a slidable member 24. A rack 26 which engages a pinion 28 of a motor 30 is mounted to member 24. Member 24 is slidably received in guideways 32, 34, which are provided in parallel guides 36, 38, respectively, rack 26 being in parallel spaced relationship to guides 36 and 38. Guideways 32 extends along the longitudinal axis of guide 36 and guideway 34 extends along the longitudinal axis of guide 38. Guides 36 and 38 are formed also with a pair of transverse guideways 40, 42 and 44, 46, respectively. Guideway 40 is in registration with guideway 44 and guideway 42 is in registration with guideway 46. Fixed guides 48 and 50 are slidably received in guideways 40, 44 and 42, 46 respectively. Fixed guides 48 and 50 are in parallel spaced relationship with one another and in perpendicular spaced relationship with guides 36, 38. Mounted to guides 36, 38 in parallel spaced relationship with guides 48, 50 is a rack 52 which engages a pinion 54 of a motor 56. It will be realized from the foregoing description that platform 22, member 24 and rack 26 are slidable in a first direction within guideways 32, 34, and guides 48, 50 and rack 52 are slidable in a second direction within guideways 40, 42 and 44, 46; the first and second directions being mutually perpendicular to one another. For convenience, by way of example, the first and second directions will be referred to as the X and Y directions, respectively. It will be readily appreciated that motor 30 operates to move platform 20 in the Y direction. Motors 30 and 56, for example stepping motors, are controlled by signals generated by a bed motion control 58 in response to command signals initiated by a general purpose computer 60, signals fed to and transmitted from the computer via a computer bus line 61. It is to be understood that platform 22 is movable also in the Z axis by means of lifting devices 62, for example jack screws. In the illustrated embodiment, computer 60 is programmed to move in a scanning sequence of 16, 8, or 4 incremental steps as disclosed in U.S. Pat. No. 3,793,520, issued Feb. 19, 1974 and U.S. Pat. No. 3,865,976, issued Feb. 11, 1975. The foregoing patents are incorporated herein by reference.

In response to command signals initiated from an operator console 64, computer 60 generates control signals that are applied to bed motion control 58. In consequence, scanning signals which operate to move bed 20 in a specified scanning pattern are generated by bed motion control 58. Individual scintillation events in detector assembly 12 are sensed and the coordinate position of each event is digitized in front-end electronics 66. All acceptable data sensed by detector assembly 12 and passed through front-end electronics 66 is accumulated and sorted in a buffer memory 68. Each event sensed at a particular XY location of the subject, defined by the XY position of platform 22 with respect to detector assembly 12, is addressed into buffer memory 68 and accumulated to previous events having the same address. The number of events stored at a given address is the number of recorded disintegrations having originated within the monitored subject at a point, the XY location of which corresponds to the given address. Following the accumulation period, the accumulated data in raw digital form is transferred to a rotating disc memory 70 via computer 60 for storage. Instructions for control of the systems operations are contained in rotating memory 70. In response to command signals generated from operator console 64, the stored data is read from rotating disc memory 70 and applied to a display 72 via computer 60 for data presentation. A magnetic tape assembly 74 is provided for permanent bulk storage of data in a retrievable computer-compatible form. Rapid loading of new programs into computer 60 is accomplished by means of a cassett 76, which also is available for storage of data. A printer and paper tape punch assembly 77 (FIG. 2B) provides permanent records.

Detector assembly 12 is an electro-optical system comprising array 18 of individual radioactive sensitive elements 78, typically distributed in columns of 21 elements and in rows of 14 elements. Each detecting element 78 is a scintillator composed of, for example, a thallium activated sodium crystal or a cesium crystal. Each crystal, which is operative to convert gamma ray energy into light energy, typically is 1 cm square by 3.8 cm deep. Array 18, which in the illustrated embodiment has 294 crystals, is mounted in spaced registration with collimator 16. The occurrence of a scintillation event in any one scintillator 78 is indicated by a light output signal that is transmitted to photomultiplier tubes 80 via a light pipe array 82. Light pipe array 82 includes a plurality of light pipe rods 84 and a plurality of light pipe spatulas 86. The address of each crystal 78 is obtained by placing two light pipes on each crystal in such a way that one half the light from each scintillation event is guided down each light pipe. Typically, the average length of each light pipe is approximately 50.8 cm. The Y coordinates are obtained by gathering 11 rods to a 5.1 cm diameter photomultiplier. The Y coordinates for the entire array require fourteen groups of rods gathered in this manner. The X coordinates are derived from 21 spatulas that are shaped and bent to fit onto the end of the 5.1 cm diameter photomultipliers. In the illustrated embodiment, there are thirty-five photomultiplier tubes 80, each photomultiplier tube converts the light output signal generated by scintillators 78 into a current. The gain of each photomultiplier tube 80 approximately doubles for each 85 volts of high voltage change within the photomultipliers operating range.

Figure 2C:
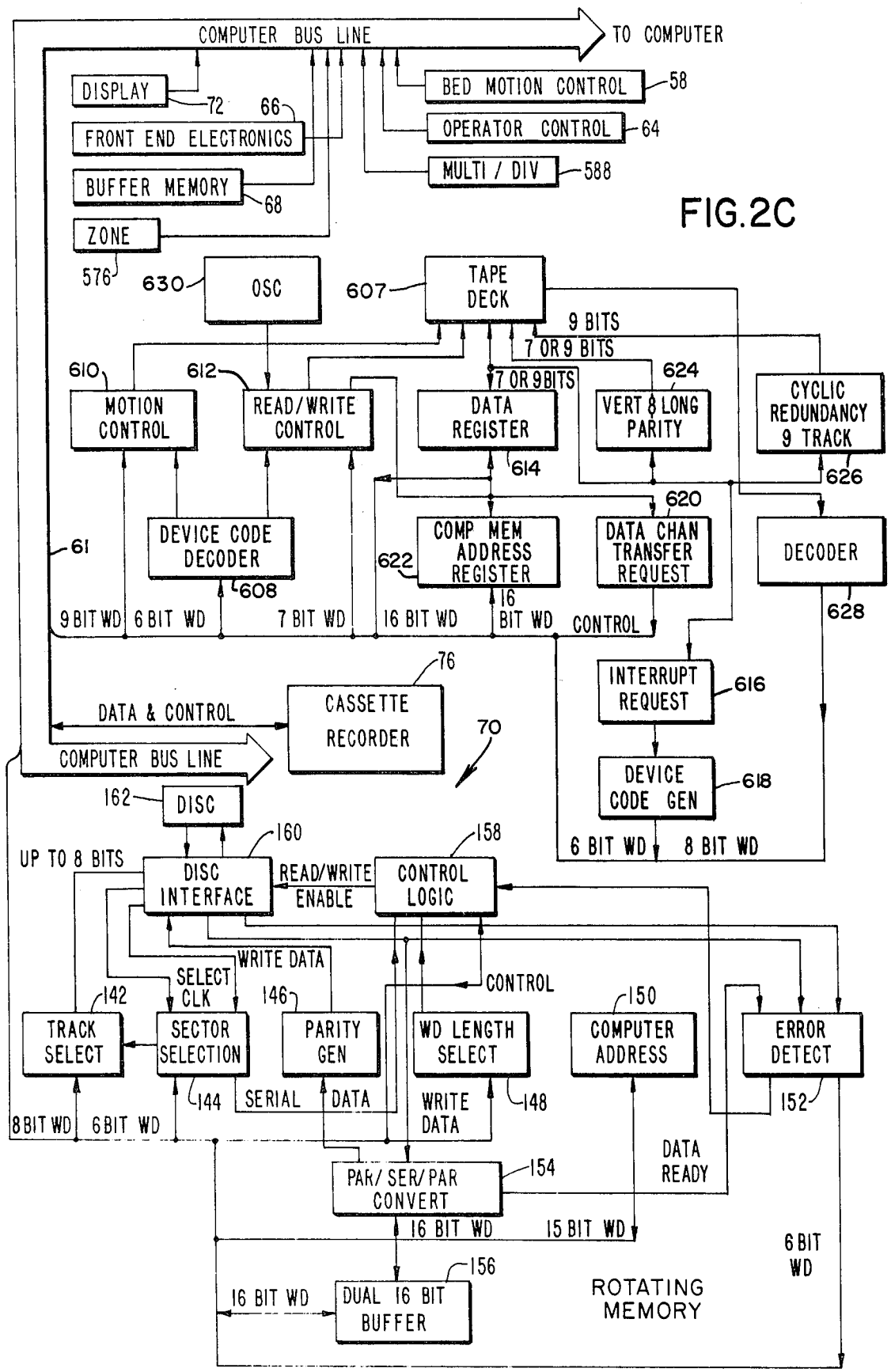

As best shown in FIG. 2B, the current generated by photomultiplies 80 is applied to preamplifiers 88 for the Y channel and preamplifiers 90 for the X channel. The preamplifiers convert the current output generated by the photomultipliers to a voltage. In the illustrated embodiment, by way of example, a maximum 1 volt output is generated by a preamplifier for a 2 nanoamp current into the preamplifier. The outputs generated by preamplifiers 88 and 90 are applied to amplifier-discriminator pairs 92 and 94, respectively. Amplifier-discriminator pair 92 includes an amplifier 96 and a discriminator 98, and amplifier-discriminator pair 94 includes an amplifier 100 and a discriminator 102. The discriminator of each amplifier discriminator pair discriminates against zero to one hundred percent of the preamplifier output by means of a discriminator control 104, the amplifier of each amplifier discriminator pair has a voltage gain of 5. In the illustrated embodiment, there are 35 amplifier discriminator pairs, 14 pairs for the Y channels and 21 pairs for the X channels.

The output signal from Y amplifiers 96 are OR'd together and fed to one input of a summing amplifier 106. X amplifiers 100 are also OR'd together and brought to a second input of summing amplifier 106. Summing amplifier 106, which has a voltage gain of 2, is associated with a single channel analyzer 108. The signal generated by summing amplifier 106 is used to determine whether the event that occurred is within the window selected by a window control 110 and lower level control 112 associated with single analyzer 108. Preferably, window control 110 and lower level control 112 are located on operator console 64.

Window control 110 and lower level control 112, for example 10-turn potentiometers, are calibrated from zero to 100%. The high voltage on the photomultiplier tubes, preamplifiers, amplifiers, and single channel analyzer are calibrated so that 100% on the lower level and window controls corresponds to a 500 keV event occurring at the crystal array. Also located on operator console 64 are eight isotope selection pushbutton switches (not shown) denoting manual position, Xenon-133 position, Technecium-99m, Iodine-133, Indium-133m, 500 keV, and two spare positions. the single channel analyzer lower level and window are in effect only when these isotope switches are in the manual position. When any other isotope is selected, the high voltage and/or window and lower level controls are changed to place the window and lower level of the single channel analyzer at a level to correspond with the isotope selected.

The spare isotope switches may be used for isotopes that become popular or for special isotopes.

An output from any Y discriminator sets a Y memory address flip-flop register 114, one Y memory address register associated with each Y discriminator. An output from any X discriminator sets a X memory address register flip-flop 116, one X memory address register associated with each X discriminator. A Y coincidence unit 118, which is connected to each of the Y memory address registers, generates a signal when one of the Y memory address registers is set. An X coincidence unit 120, which is connected to each of the X memory address registers, generates a signal when one of the X memory address registers is set. A coincidence-anticoincidence logic circuit 122, which receives the signals from Y coincidence unit 118 and X coincidence unit 120, generates an output signal when (1) one and only one X flip-flop 116 is set and (2) one and only one Y flip-flop 114 is set. The signal generated by coincidenceanticoincidence logic circuit 122 and the signal generated by single channel analyzer 108 are applied to buffer memory 68 via an AND gate 124 as a single channel analyzer output denoted SCA OUT in FIG. 2. The signals generated by Y memory address registers 114 and X memory address registers 116 are decoded in decoders 126 and 128, respectively. The decoded signals, which are in binary form, are applied to buffer memory 68 for temporary storage.

BUFFER MEMORY

Buffer memory 68 includes a control logic 130, a data channel transfer request 132, an address register 134, a data register 136, a preset count comparator 138, and a solid state memory 140. The SCA OUT signals are applied to control logic 130 and the decoded signals are applied to address register 134. The single channel output signals are writte into memory 140, for example a 294 × 16 solid state memory, when a control signal generated by computer 60 enables control logic 130. Y address registers 114 and X address registers 116 are incremented by a signal applied thereto from control logic 130. As each event is written into memory 68, buffer memory address register 134 is incremented by 1 in order to provide address location data to memory 140. That is, the event data is stored in memory 140 at address locations specified by buffer memory address register 134 which receives position data in binary form from decoders 126 and 128. The data stored in memory 140 is read out of the memory by means of a data request signal that is generated by computer 60. The data request signal is applied to data channel transfer request 132 and control logic 130. The stored data in memory 140 is transferred to buffer memory data register 136. When the data in buffer memory data register 136 is the same as a preset count in comparator 138, a signal is applied to computer 60 indicating that the proper data is being read out of memory 140. The data is then transferred from data register 136 to rotating disc memory 70 via computer 60.

Memory 140 is a solid-state memory made from 1101 type memory chips. These are 256 × 1 bit chips; that is, each chip has 256 addresses with 1 bit each. Thirty-two of these chips are used to form a 512 × 16 bit memory 68. Two hundred ninety-four of these addresses are used. The arrangement of the logic and chips is such that 32 addresses are used for each row of the matrix array. This method of organizing the memory greatly decreases the logic required to operate the memory and allows an easily expandable memory unit.

There are five methods of controlling or operating memory 140. These are Count Mode, which increments a location in memory 140 whenever a legal event occurs; a Transfer Mode which transfers the 294 addressed from memory 140 into computer 60; a Transfer and Clear Mode, which transfers 294 locations in memory 140 and, after each address is transferred, that address is cleared in the memory; a Clear and Transfer Mode in which each address is cleared and the cleared data is transferred into computer 60. The last operation is a Test Mode which is used in diagnostic programs. This mode allows each address of memory 140 to be incremented by 1 count each time the memory is transferred in to computer 60. The Clear and Transfer mode of operation enables the software to clear the memory and the computer core memory in one operation. Since this clears each address in the buffer memory to zero and then transfers zero into the computer, the computer input area will be all zeroes following the operation.

Buffer Memory Data Address Register 134 is designed in a 4-bit serial parallel fashion, for a trade-off between speed and the number of logic elements required to perform the function. Data address Register 134 is a counter, for example a 16-bit counter and contains eight low order bits and eight high order bits. Although buffer memory data address register 134 is a counter, it cannot be looked at in the manner that you would normally look at a counter. This is due to the fact that it never increments more than one count at a time. When an event occurs and an address is called for, this address is read from memory 140 into register 134, incremented by one count, and returned to the memory. Since in the normal operation the addresses that are selected in the buffer memory do not always occur in the same address, the count that will be seen is varying.

Preset count comparator 138 consists of a 16-bit buffer register and 16 bits of comparator circuitry. Before a count mode is actually started, the software reads four thumbwheel switches (not shown) on operator console 64 that are set up for the preset count. This information is read as a 1-2-4-8 BCD code. Software converts this number to binary and outputs it to preset count comparator 138. Each legal event occurring generates a buffer memory cycle. During the write portion of this buffer memory cycle, after memory 140 has been incremented, this data is compared to what has been set up in the buffer register 136 for a preset count. If there is a comparison, a Set Preset count pulse is generated. This signal is fed to buffer memory control logic 130 and resets the hardware for the count operation. It also causes a programmed interrupt to computer 60, thereby notifying the computer that a preset count has been reached. Preset count is presettable from 1 to 9,999 counts. A preset count setting of zero is used to select one count higher than 10,000. The normal meaning of zero in preset count is $2^{14}$. The count $2^{14}$ was selected so that a 4:1 ratio would be available for correcting count data. The meaning of zero on the preset count switches is changeable through software and may be changed to any number from 10,000 to $2^{16}$.

Buffer Memory Control Logic 130 includes a 5-bit register that is controlled by the computer software and a potentiometer that allows a memory read strobe to be adjusted. The strobe time should be 1 microsecond after a Read command is given to memory 140. At the end of the Read command, the data is strobed into buffer memory data address register 136. In the case of the Count mode, an Add One pulse is generated to increment the register by 1. Or, in the case of Transfer mode, the data is transferred in. After the Add One pulse occurs, a Write command is given to memory 140 so that the incremented data in data address registers 136 can be written back into the memory. This Write command is between 410 and 450 microseconds wide. A Memory Busy timing signal is started at the Read command time and continues until the end of the Write command time. It must be remembered that, if the Read timing is changed or the Write timing is changed, the Memory Busy timing must also be changed so that the Memory Busy will coincide from the Read command time to the end of the Write command time.

At the time buffer memory 68 is set up for a transfer to computer 60, the input address registers 134 are set up to the N1 location of the buffer memory and also the core memory 140. After 294 locations have been read in, the input address registers are at the Z21-Y14 position, buffer memory control logic 130 is reset and a Done flag is generated. The software looks at the Done flag to determine whether or not the transfer of data from buffer memory 68 has been completed. The data, which has been temporarily stored in buffer memory 68, is transferred to rotating disc memory 70 via computer 60. Rotating disc memory 70 is operative to complement the computer memory and to store data and programs for controlling system operation.

ROTATING DISC MEMORY

Rotating disc memory 70 comprises a track selector 142, a sector selector 144, a parity generator 146, a word length selector 148, a computer address 150, an error detector 152, parallel/serial/parallel converter 154, a dual 16 bit buffer 156, a control logic 158, a disc interface 160, and a disc memory 162. Typically, three 16 bit words generated from computer 60 are used to write data into rotating disc memory 70 and to read data from the rotating disc memory. The first word is applied to track selector 142 and sector selector 144 for indicating which track and which sector of that track is of interest. The second word is applied to computer address 150 for indicating where the data is in computer 60. The third word is applied to word length selector 148 for indicating the number of words in the transfer and is applied also to control logic 158 for indicating whether the operation to be performed is a Write function or a Read function. In the case of a Write function, control logic 158 generates a data transfer signal, for example 3-16 bit words, which is applied to computer 60. The words to be written into disc 162 are applied in parallel to parallel/serial/parallel converter 154 via dual buffer 156. Sixteen bit words are applied in parallel to parallel/serial/parallel converter 154 from dual bit buffer 156 and are converted to serial data in the converter. The serial data is applied to disc interface 160 through parity generator 146 which adds a parity bit. The data is transferred from disc interface 160 in serial fashion to disc 162 for storage. In the illustrated embodiment, two words of data are stored in dual buffer 156 and one word is stored in parallel/serial/parallel converter 154. When parallel/serial/parallel converter 154 is emptied, the next word is transferred from dual buffer 156. Control logic 158 generates a signal to computer 60 and the next word is loaded into dual buffer 156. As each word is transferred, the computer address is incremented by one. In addition, word length selector 148 is incremented by one for each word transfer. When word length selector 148 has been incremented an amount that corresponds to the length of the transfer specified in the third word, it generates a signal to control logic 158 for stopping the transfer. In the case of a Read function, control logic 158 is instructed to a Read mode.

Generally, the operation of rotating disc memory in the Read mode is similar to the Write mode. That is, a first word is applied to track selector 142 and sector selector 144 to indicate on which track and at which sector the desired data is stored on disc 162. A second word is applied to computer address 150 for specifying where the data is to be stored in computer 60. A third word is applied to word length selector 148 and control logic 158 for indicating the length of the transfer and to initiate the Read function, respectively. The data is Read in a serial fashion and converted to parallel words in parallel/serial/parallel converter 154. As the data is read into converter 154, it is also read into error detector 152. Error detector 152 looks at the first 16 bits and generates a parity bit. If the parity bit is the same as the parity bit added during the Write mode, the correct word is being transferred. Error detector 152 also generates error signals when data is not being written in or read out at the proper rate by comparing the write rate and read rate of computer 60 and disc 162. The correct word is then transferred to computer 60 from parallel/serial/parallel converter 154 via dual buffer 156. In the Read mode, only one buffer is used in dual buffer 156. As previously indicated, data that is read into and written out of disc 162 passes through disc interface 160 which defines a controller for disc 162. The details of controller 160 are shown in FIG. 3.

DISC INTERFACE

Figure 3A:
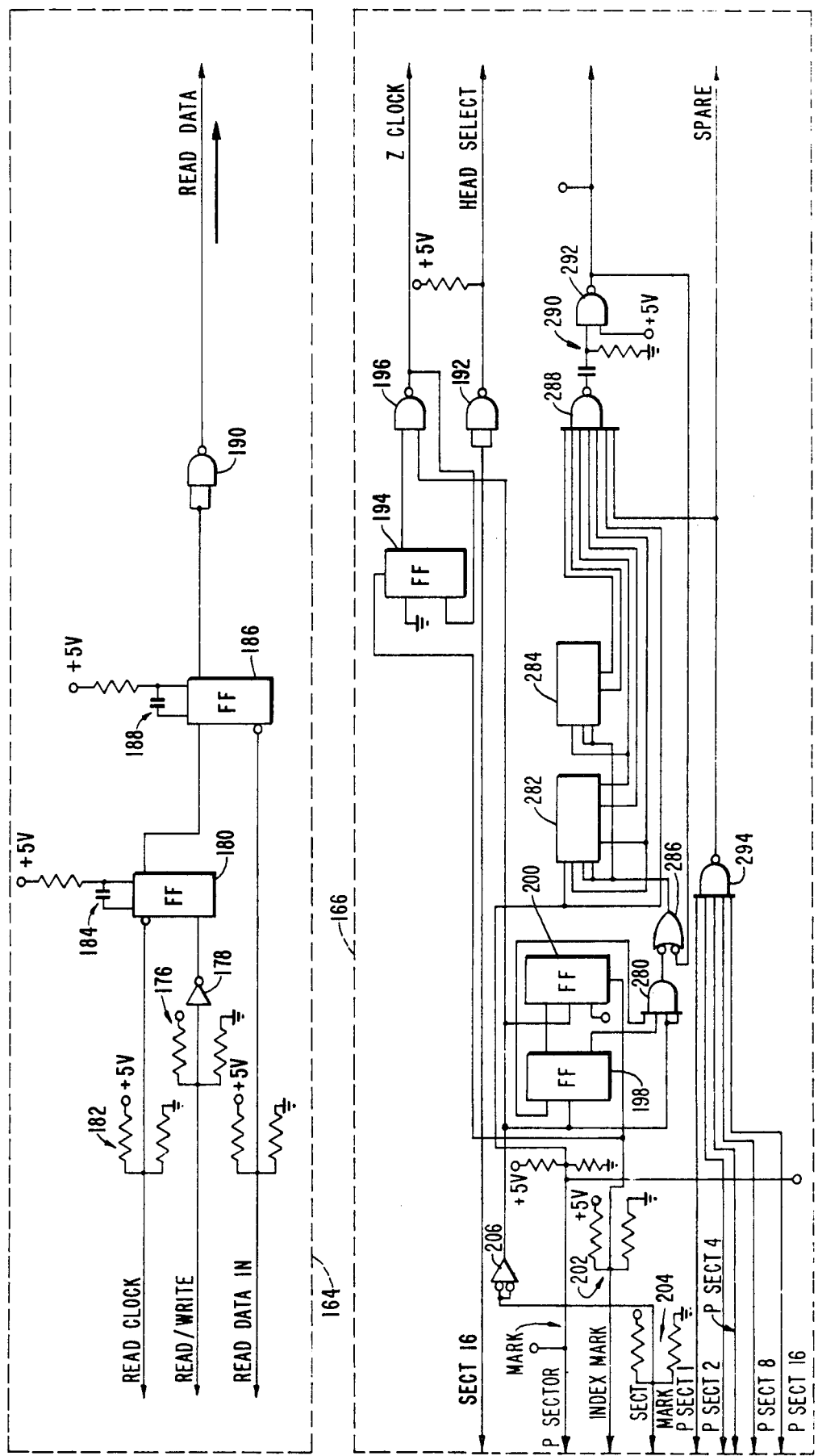
FIGS. 3A, 3B and 3C are detailed schematic diagrams of the disc interface assembly of FIG. 2C.
Figure 3B:
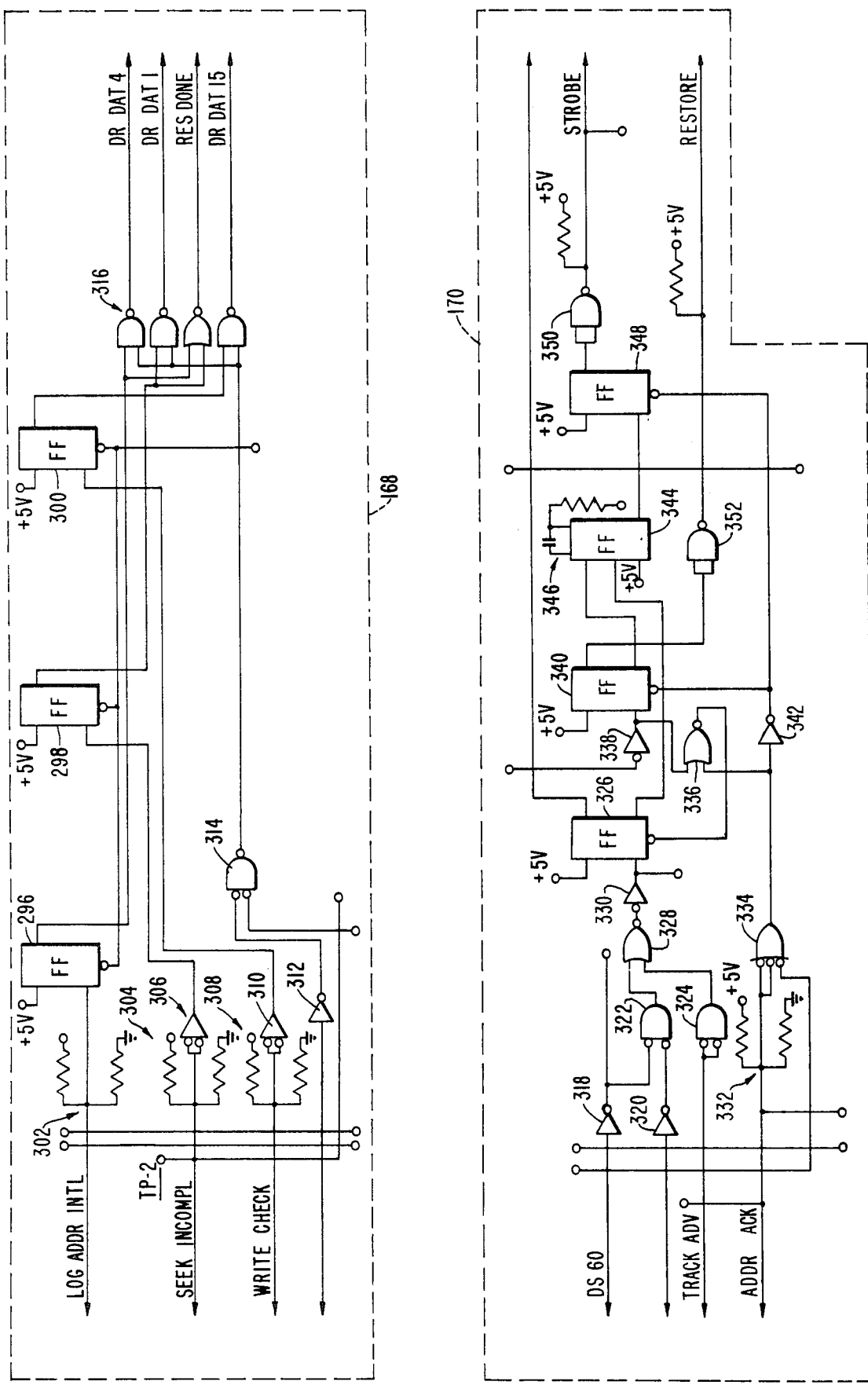
Figure 3C:
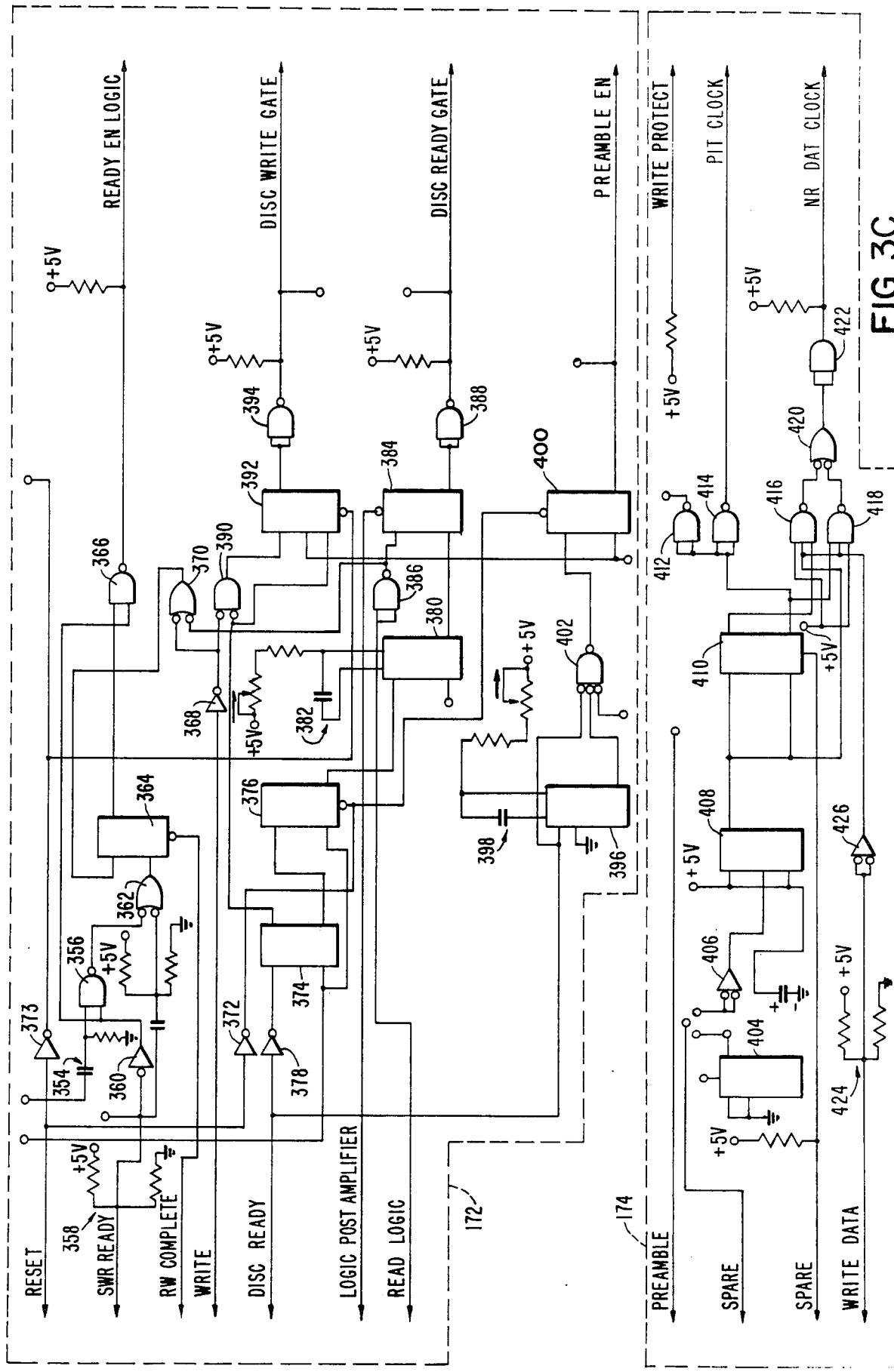

Referring now to FIGS. 3A, 3B and 3C, it will be seen that controller 160 includes a separator 164, a formator 166, an error buffer 168, a converter 170, a preamble and postamble generator 172, and a write clock generator 174. Separator 164, which converts read data into data signals that can be read onto the disc, receives a read clock signal and a read data in signal from disc 162 and a read/write signal from control logic 158. The read/write signal is applied through an impedance matching circuit 176 and an inverter 178 to a one shot multivibrator 180. The read clock signal is applied to one shot 180 through an impedance matching circuit 182. A timing network 184 connected to one shot 180 is provided for controlling the pulse width of the signal generated by one shot 180. The signal at the output of one shot 180 and the read data in signal are applied to a one shot 186. If the signal at the output of one shot 180 and the read data in signal occur at the proper time, a pulse is generated by one shot 186. A timing network 188 is provided for controlling the pulse width of the signal generated by one shot 186. The signal at the output of one shot 186 is fed through a buffer 190. The signal at the output of buffer 190 constitutes a read data signal which is applied to parallel/serial/parallel converter 154 and error detector 152.

Formator 166, which generates data signals identifying a particular track and sector on the disc, receives a psuedo sector mark, an index mark, a sector mark, and various position sector marks, each of the foregoing signals being generated by disc 162. The index mark is generated for each revolution of the disc and indicates that the disc has made one revolution. The sector mark is generated at the rate of 12 times for each revolution of the disc and is used to indicate the position of the disc relative to a read/write head 191 (FIG. 1). The psuedo sector mark is an electronically generated mark that occurs 2,000 times per revolution of the disc. The position sector marks indicate the position of the disc relative to read/write head 191. A sector signal from the disc is applied through a buffer 192 to indicate which side of disc 162 is being used. The index mark is applied through a D flip-flop 194 and a buffer 196 and read out as an index clock, which is aligned with the first sector mark after the index mark. The index mark is also applied as a reset signal to JK flip-flops 198 and 200 which constitute a divide by three circuit. The index mark is applied in the foregoing cases through an impedance matching network 202. The sector mark is applied through an impedance matching network 204 and an inverter 206 to the set terminals of JK flip-flops 198 and 200. The signals at the output terminals of JK flip-flops 198 and 200 are applied to a gate 280, which also receives an inverted sector mark at an output of inverter 206. The output from gate 280 is applied to a pair of divide by sixteen circuits 282 and 284 as a reset signal through a gate 286. Divide by sixteen circuits 282 and 284 are connected as a divide by 61 circuit. The psuedo sector mark is also applied to dividers 282 and 284 as a set signal. The signal at the output of the divide by sixty-one circuit is applied through a gate 288, a differentiator 290 and a gate 292 for generation of a sector clock signal which occurs 32 times per revolution of disc 162. These 32 marks or sectors represent each revolution of the disc and constitutes the number of sectors per track on the disc. It is to be noted that the position sector signals are gated with the outputs of the divide by 61 circuit in gate 282 after having been processed through a gate 294.

Error buffer 168, which generates data signals indicating that the disc is operating properly, receives a logical address interlock signal, seek imcomplete signal, and a write check signal from disc 162. A data input signal denoted NDAT IA is received from computer 60. The logical address interlock signal provides an error indication if the address to which read/write head 191 is to be positioned is greater than the number of tracks on the disc, in this case greater than 203. The seek incomplete signal provides an indication that head 191 is unable to find the particular track requested. The write check signal provides an indication of a hardware failure in disc 162. These error indications, the logical address interlock, the seek incomplete, and the write check are applied to flip-flops 296, 298 and 300, respectively. These error signals are held in the flip-flops until the computer requests information indicating whether or not the read/write head has been moved to the particular location requested on the disc. The logical address interlock is applied through an impedance matching network 302 to flip-flop 296. The seek incomplete is applied through an impedance matching network 304 and an invertor 306 to flip-flop 298. The write check signal is applied through an impedance matching network 308 and an invertor 310 to flip-flop 300. The data input signal NDAT IA is applied through an invertor 312 and a gate 314 to a gate assembly 316, which also receives signals from each of flip-flops 296, 298 and 300. A device 60 signal denoted DS 60 generated by computer 60 is applied also through an inverter 318 and gate 314 to gate assembly 316. The signals at the output of gate assembly 316 are denoted DR 4, DR 1, DR 15 and DONE. Each of the signals are applied to control logic 158.

Converter 170, which generates data signals indicating that the read/write head is in the proper position, receives the DS 60 signal and a data output signal denoted NDATO A from computer 60; and a track advance signal, a disc ready signal, and an address acknowledgment signal from disc 162. The DS 60 and NDATO A signals are fed through inverter 318 and an inverter 320, respectively, to a gate 322. The track advance signal is applied to a buffer 324. The signals at the output of gate 322 and buffer 324 are applied to a flip-flop 326 via a gate 328 and an inverter 330. The address acknowledge signal is applied through an impedance matching network 332 and a gate 334 to a gate 336 which generates a reset signal to flip-flop 326. The logical address interlock signal is applied also to gate 334. The seek incomplete signal is applied through an inverter 338 to gate 336 and to a flip-flop 340. The signal at the outut of gate 334 is applied as a reset signal to flip-flop 340 via an inverter 342. Output signals from flip-flops 326 and 340 are fed to a one shot 344 having a timing circuit 346 for pulse width control. The output signal generated by one shot 344 is applied to a flip-flop 348, the output of which, after passing through a buffer 350, defines a strobe signal that indicates that the track is ready to be read. The strobe signal is applied to track selector 142 and disc 162. The address acknowledge signal generated by disc 162 indicates that the read/write head 191 is in position on the track requested and resets flip-flops 326, 340 and 348 to remove the strobe signal. In the illustrated embodiment, the sectors on one track are rotated one half a revolution from the sectors on an adjacent track in order to leave time for head 191 to move from one track to the next track. The track advance signal is a command that indicates that the last sector of the track is being used and read/write head 191 is to advance to another track. As previously indicated, a signal generated by work length selector 148 provides an indication to track selector 142 that more data is to be written and that another track is needed. In the preferred embodiment, the sectors on each track are sequentially numbered. Unlike conventional systems which number the sectors by track, i.e. the sectors on corresponding tracks are distinguished by a track number, the present invention provides sequentially numbered sectors in which read/write head 191 travels from one track to the other without additional instructions from the computer and without interruption in the read or write process. In conventional systems, a new instruction is generated by the computer at the end of each track, the system being interrupted at the end of a track. The seek incomplete is provided to set flip-flop 340 which generates a restore signal via a buffer 352. The restore signal is operative to move read/write head 191 to a position zero relative to disc 162. The address acknowledge signal from disc 162 is applied also to a filter network 354 and to a gate 356 is preamble and postamble generator 172.

Preamble and postamble generator 172, which generate data signals indicating where data is to be read or written in the track sector, receives a disc reset signal, a read/write complete signal, a write signal, a postamble signal, and a read signal from control logic 158 and a seek read/write ready signal from disc 162. The seek read/write ready signal is applied through an impedance matching network 358 and an inverter 360 to gate 356 which inputs a flip-flop 364 via a gate 362. The read/write complete signal is applied to flip-flop 364 as a reset signal. An output signal generated by flip-flop 364 and the signal at the output of invertor 360 is applied to a gate 366, the output of which is applied to control logic 158 as a disc ready enable signal. The write signal is applied through an inverter 368 to one side of a gate 370, the output of which is applied to flip-flop 364. The disc reset signal is applied through an inverter 372 to a flip-flop 376. The disc reset signal is applied also through an inverter 373 to a flip-flop 392. The disc ready signal is applied through an inverter 378 to a flip-flop 374. Both flip-flops 374 and 376 receive the psuedo sector mark. Flip-flop 374 inputs flip-flop 376, which applies a signal to a one shot 380 having a timing network 382 for controlling the width of the pulse at an output thereof. The output pulse generated by one shot 380 is fed to an input of a flip-flop 384, the read signal being applied through a buffer 386 to another input of flip-flop 384. The output signal generated by flip-flop 384 is applied through a buffer 388, the output of which defines a read gate that is transmitted to disc 162. The write signal at the output of inverter 368 is applied through a gate 390, the output of which is applied to a flip-flop 392. A signal at the output of flip-flop 374 is applied to another input of flip-flop 392. The signal at the output of flip-flop 392 is applied through a buffer 394, the output of which is denoted as a write gate and is applied to disc 162. The disc ready signal is applied to a one shot 396 having a timing network 398 for determining the pulse width of the signal at the output thereof. The preamble signal, a signal at the output of one shot 396, and the disc ready signal are applied to a flip-flop 400 via a gate 402. The signal at the output of flip-flop 400, which is denoted as a preamble enable signal, is applied to disc 162. Preamble and postamble generator 172 defines a preamble area and a postamble area which are the unused areas between adjacent sectors on each track. That is, the dead spot areas between the data area of any sector of a track and the sector marks defining that sector on the track. The preamble mark tells where the data is to begin and the postamble marks defines where the data ends. The seek read/write ready signal indicates that disc 162 is not performing any of the functions denoted in connection with converter 170 and that the disc is available. The disc ready enable signal indicates that the disc is available and an address acknowledge signal is generated. The write gate is turned on at the sector mark and starts writing zeros in the preamble area. The disc ready signal is applied to one shot 380 which generates the zeros that are to be written into the preamble area. When the data area approaches, the preamble enable signal is generated and combines with the write gate to generate a preamble bit mark. Immediately following generation of the preamble bit, preamble data is read from the parallel/serial/parallel converter 154 during the write cycle. In the read cycle, the read gate is turned on and after a predetermined time period, the preamble bit mark is sought. The reason for the predetermined time period is to avoid bits put inadvertently on the disc by read/write head 191. Parallel/serial/parallel converter 154 does not allow data to be read until the preamble bit mark is sensed.

Write clock generator 174 generates clock signal to indicate the rate at which the bits are to be placed on the disc, for example, a rate of 1.559 megacycle. Write clock generator 174 includes a 6.248 magacycle crystal oscillator 404 and inverter 406 and flip-flops 408 and 410. A signal at the output of flip-flop 410 is applied to buffers 412 and 414. The signal at the output of buffer 414 is a bit clock. The signal at the output of buffer 412 is applied to flip-flops 392 and 400. The output signals of flip-flop 410 are applied also through gates 416 and 418. The signals at the outputs of gates 416 and 418 are applied to a gate 420 and a buffer 422, the signal at the output of buffer 422 being a write data clock which is applied to disc 162. A write data signal from parallel/serial/parallel converter 154 and parity generator 146 are applied through an impedance matching network 424 and an inverter 426 to gate 418.

DISPLAY

Display 72 includes an interlaced television type display with a total of 525 lines, for example. A local oscillator 500, for example a crystal oscillator, is provided for all the timing in the display circuitry. Crystal oscillator 500 generates a basic clock at a frequency of 6 megacycles. A clock 502, which is driven by crystal oscillator 500, includes a plurality of interconnected divide by ten assemblies 504, 506, 508, 510, 512, and 514 for generating timing signals that control system timing. These timing signals are applied to the system via computer 60. For certain gray scale generation, a basic frequency of 6 megacycles is doubled. A timing circuit 516, driven by crystal oscillator 500, generates, in the first place, horizontal and vertical sync signals for a hard copy interface 518, a color monitor 520, a main monitor 522, a photo-monitor 524, and a remote monitor 526. The horizontal sync pulses are about 63.5 microseconds apart, and the vertical sync pulses are about 16.66 milliseconds apart. A Display Program and Positioning circuitry 528 positions alphanumeric characters and gray scale characters along the horizontal scan line with the help of 6 megacycle clock 500. As soon as the display program and positioning circuitry begins the display of a row of new data, which could be either gray scale data or alphanumerics, it generates an input request pulse to a data channel transfer circuitry 530. Data channel transfer circuitry 530 generates a data channel request to computer 60, which interrupts the program. After the program has been interrupted, computer 60 generates a data channel transfer signal which includes the number of words needed for the next row of data to be displayed, the data channel transfer signal is applied to a memory address register 532 which keeps track of the address in the core that are being put out to the display circuitry.

If anything on the display has to be changed, if the display has to be turned off, or if the display type has to be altered, it is done by the program which then first sets up all the data for the display plus the code for the type display desired into a certain core area. After this has been finished, the program sets up memory address register 532 for two things: (1) the first address to be put out to the display circuitry, and (2) the last address to be put out for the display circuitry. In the last address, it puts in core the complement of the first address that will be put out. After all of this has been done, the software has to allow for the data channel transfer request to come through. This, in fact, turns on the display, because a display data interface 534 generates a code for blanks to the rest of the display circuit as long as the data channel transfer request is not allowed for by the software. So, if program and positioning circuitry 528 requests a data channel transfer, the program is interrupted and the computer goes in a data channel transfer for the data needed for the next row of the display. This data is fed into a display data memory 536, which at the same time is used for the data being displayed on a color camera 538 or a black and white camera 540 that moment. Display data memory 536 is continuously switched from Read to Write with the preference for the reading, because the electron beams in the displays keep flying over the screen; and, therefore, character generators 542, 544, 546, and 548 need new information at certain time intervals. During the display data channel transfer, a display memory control logic 550 switches continuously the address of display data memory 536 from the address for reading data to the address for writing new data into the memory. At the same time, display memory control logic 550 switches from Read to Write.

Display data memory 536 can contain a total of 64 words of 16 bits. A memory data selection 552 provides 4, 6 or 8 bits for the character generators. Display memory control logic 550 provides a specific address in display data memory 536 so that a 16-bit word is available on the output. This 16-bit word is then chopped in either 4 or 2 bytes, depending on what character is being used at the moment.

There are four types of character generators: curve generator 542 which uses 8-bit bytes, diamond generator 544 which uses 8-bit bytes, scan type gray scale generator 546 which uses 4-bit bytes, and alphanumerics generator 548 which uses 8-bit bytes. One of these character generators is selected by display program and position 528 according to the type of display and the position of the electron beam on the screen.

The diamond type of display uses only 5 bits from the 8-bit bytes, and the alphanumerics display uses 6 bits. If during displaying of diamonds, a code for any alphanumeric number comes up, the diamond-type display makes place for a number-type display by switching a monitor driver 554 over to the alphanumerics inputs. Monitor driver 554 receives its inputs from the curve generator 542, diamond generator 544, scan type generator 546, and alphanumerics generator 548. Display program 528 selects on monitor driver 554 any one of these, except when the diamond type of display is being generated, in which case the diamond type of display can be interrupted to display an alphanumerics character.

Monitor driver 554 constitutes a selector for the different types of display and is controlled by the display program and the code for an alphanumeric number. Monitor driver 554 generates an on-off signal for the different types of monitors and, at the same time, generates sync signal to the different monitors. Monitor driver 554 generates a separate output for the main monitor and the photo monitor. In case remote monitor 526 is being used, photo monitor 524 is just daisy-chained to the remote monitor.

A color interface 556 is a special type of character generator which is controlled by the display program and positioning circuitry 528. There is one difference with the other character generators, which is that the color interface gets an input from the monitor driver in case diamonds or alphanumerics are being generated.

The following illustrates a display character actually being generated, for example a specific character which requires 10 scan lines and, in a horizontal direction, 1 microsecond. This means that every 1 microsecond on the input of the character generator, there needs to be a new byte of data available for the next character to be displayed. This is taken care of by the memory data selection circuitry 552 in combination with the display memory control circuitry 550. As the total character is 10 scan lines high but the display type is an interlaced scan display, every 5 scan lines there has to be new data available in display data memory 536 for a whole next row of characters. This is why at the start of a row of characters the display program circuitry 528 initiates a data channel transfer request. At the same time, display data memory 536 is being used for putting characters on the screen, the data for the next row of characters is being put in this memory. A certain time after every horizontal sync pulse, a specific character has to be generated. At this moment, the character generator has on its input the required number of bits coded to determine what kind of character it will be. This will be repeated during the five lines of each field, or a total of ten lines to generate the character.

If, in a horizontal direction, the character consists of 6 points, at these points the electron beam is just being turned on or off according to 6 outputs of a read only memory that is provided in the character generator. Each one of these outputs addresses one specific point on the screen for a certain type of character. So if, for instance, output No. 1 controls the first point in a horizontal direction, this output has to be gated through to the beam Z-axis drive at the moment the beam is passing that first point. Then the second output has to be selected for the moment the spot on the screen passes the second point, and so on, until the six points have been written on the screen. By the time that they have been written, new data is available on the inputs of the character generator; and, at the moment the beam goes from one character to the next one, a new group of bits is being used for this new character.

As previously indicated, the clocks used in the system are all derived from the 6 megacycle crystal-controlled oscillator 500. The output of this oscillator is divided by 6 to product a 1 megacycle signal. It is then divided by six divide by 10 circuits to get any times down to a 1 hertz signal out of the timing. There are two clocks used by the basic system. One is the 10 millisecond clock at the output of divide by ten 510 that is used during the Count modes to keep track of the count time. This clock causes a programmed interrupt to the computer every 10 milliseconds. When computer 60 recognizes this interrupt, it can increment a counter to keep track of elapsed time. The softward can determine the time to an accuracy of 1 millisecond, and any time between these 10 millisecond interrupts, by reading the output of divide by ten 512 which divides the 1 kilohertz signal down to 100 hertz. The output of the last three divide by ten circuits 510, 512, and 514 are read into computer 60. Therefore, the computer has the fraction of the last second elapsed in milliseconds entered into the computer's accumulator. Counters in the divide by ten circuits can be reset by the computer software so that computer 60 knows when time zero is. For instance, at the beginning of a Count mode, the computer would reset the timer circuitry, then start counting the 10 millisecond clock. At the end of the count operation, a counter or register internal to the computer would have totaled the 10 millisecond increments that had elapsed, and the computer at this time can read the timer countdown circuits to get the time accurate to 1 millisecond.

The display transfer interrupt is used during the Count modes of operation if there is a Line Display during the counting. When the computer recognizes this interrupt and a Live Display is required, the computer updates the dat that has been counted up to this period of time, according to the display controls, and presents the data on the display monitors. A hard copy unit 557, which is connected to hard copy interface 518, provides a permanent record of the display data.

OPERATOR CONTROL

An operator notifies computer 60 as to the operation desired by setting switches (not shown) on a control panel 558 and a control module 560. Signals generated the switches on control panel 558 are applied to a decoder 562 via a contact bounce eliminator 564 and signals generated by the switches on control module 560 are applied to decoder 562. Signals at the output of decoder 562 are applied to an interrupt request generator 565 which generates a request signal for interrupting computer 60. The signals applied to contact bounce eliminator 564 cause an interruption only when the switches are depressed and the signals applied directly to decoder 562 from control module 560 cause an interruption on both selection and release of the switches. The signals generated by the switches on control panel 558 and control module 560 and applied to an interrupt request generator 565 are transmitted to computer 60 via a device code decoder 566 which generates a signal that identifies the energized switch. The signal generated by decoder 562, for example sixteen bit words, are applied to computer 60 for control thereof. The computer generates 6 bit words which are applied to lamp drivers 568 via a device code generator 570 and generates 16 bit words which are applied to lamp drivers 568. The signals generated by the lamp drivers are applied to a backlighting control 572 for providing the operator with an indication of the functions being performed by the computer. These indications are provided by backlighting a front panel composed of methyl methacrylate that is provided with code indicia which are not visible unless illuminated. Also includes in the operator console is a zone control which generates a zone signal that is applied to computer 60 via decoder 562 for activating a zone unit 576.

ZONE

Zone unit 576 includes a zone module 578, an address decoder 580, a control decoder 582, an interrupt request generator 584, and a device code decoder 586. Zone module 578, the details of which are disclosed in U.S. Pat. No. 3,865,976 issued on Feb. 11, 1975 and incorporated herein by reference, is provided as a means for the operator to select particular zones of interest of the data presented on the displays. An interrupt signal generated by zone modules 578 is applied to interrupt request generator 584 which generates a request signal that is applied to computer 60. Interrupt request generator 584 feeds device code decoder 586 which generates a 6 bit word that is applied to computer 60. The 6 bit word indicates that zone unit 576 has been activated. Data signals generated by zone module 578 are applied to control decoder 582 and address decoder 580. Control decoder 582 generates a data signal that is applied to computer 60. The data signal generated by control decoder 582 indicates whether a particular flag number of an asterisk mark is to be presented on the display. Address decoder 580 generates a data signal which identifies the XY location on the display that the data signals generated by control decoder 582 are to be placed.

MULTIPLY/DIVIDE

A multiply/divide assembly 588 that is interconnected with computer 60 is provided for increased efficiency of the system by decreasing operational time. Multiply/divide assembly includes sixteen bit registers 590, 592, and 594, a sixteen bit adder 596, a control logic 598 and a device code decoder 600. The multiply portion multiples two 16 bit words to provide a 32 bit word, i.e. a double precision word. In the multiplying steps, unsigned integers in registers 592 and 594 are multiplied together to generate a double length product which is added to an unsigned integer in register 590. The high and low order parts of the result are entered into registers 590 and 592, respectively, register 594 being unchanged. The divide portion divides a 16 bit word into a 32 bit word to 16 bit remainder. In the illustrated embodiment, registers 590 and 592 are 16 bit shift left, shift right registers and register 594 is a 16 bit latch register.

Multiplication is performed by a succession of additions from registers 590 and 592 whose outputs are fed into adder 596. Registers 590 an 592 are shifter right with register 590 being shifter into register 592 to form the final 32 bit results. 16 successive additions are required to form the multiplication of two 16 bit words. The additions are performed approximately every 660 nanoseconds, the total multiply time of approximately 10.5 microseconds.

Division is performed by a succession of subtractions. Adder 596 subtracts by using the ones complement of the number to be subtracted, the carry input to the least significant bit of the adder being equal to a logical one. This operation actually does a two's complement addition to perform the subtraction function. The highest sixteen bits of the divided are placed in register 592 and the divisor is placed in register 594. The complement of register 594 and the output of register 590 are fed to adder 596. The carry output of adder 596 is shifted left into register 592, and registers 590 and 592 are shifted left at this time with register 592 being shifted into register 590. Register 594 is unchanged. Registers 590 and 592 receive the quotient or the results.

Control logic 598 generates (1) the clock signals required to shift the data from computer into registers 590, 592 and 594, (2) the clock signals to generate shift left and shift right of registers 590 and 592, and (3) the clock signal to transfer adder 596 results into register 590 or the output of registers 590 and 592 back into register 592 for the shift left operation. Control logic 598 generates also logic levels for control of the registers. A device code, which identifies multiply/divide unit 588, is generated by device code decoder 600.

MAGNETIC TAPE magnetic tape assembly 74, which is provided for permanent long time storage of data on a magnetic tape in a tape deck 607, is actuated by local controls on control panel 558 via computer 60. These local controls generate an interrupt request which provides an indication that magnetic tape unit 606 is requested. Computer 60 generates data signals which are applied to a device code decoder 608, a motion control 610, and a read/write control 612. The data signal applied to device code decoder 608 indicates that the data on the bus line is for magnetic tape assembly 74. The data signals applied to motion control 610 control movement of the tape in tape deck 607, for example forward, reverse, fast forward, slow forward, etc. In a read mode, data on the tape is read through a data register 614. As the data is read from tape deck 607, it is applied to an interrupt request 616 and a device code generator 618. Interrupt request 616 generates an interrupt signal which is applied to computer 60 and device code generator 618 generates a signal which is applied to computer 60 and indicates that the interrupt signal is being generated by magnetic tape assembly 74. Computer 60 looks at the interrupt signals until a tape gap, i.e. a break in the data on the tape, is received. As this point, computer 60 sets up a data channel transfer request 620 by outputing to a computer memory address register 622 which provides an address location as to where data is to be read out of or written into the computer. The data generated by data channel transfer request 620 is examined by computer 60 to verify that this is the data requested by the operator. If the data is not the data requested, the process hereinbefore described in connection with motion control 610 continues until the data requested is found. Once the data requested is located, the data is read from tape deck 607 via data register 614 and is applied to computer 60.

In the write mode, computer 60 generates data signals which activate motion control 610 and sets up read/write control 612 for the write mode. In addition, the first word to be written on the tape is applied to data register 614. Thereafter, the word in data register 614 is written on the tape and a signal generated by data channel transfer request 620 is applied to computer 60 and the next word is fed into the data register. As the data is being transferred, a vertical and longitudinal parity generator 624 generates a vertical parity bit. In the illustrated embodiment, the words written on the tape are seven or eight bit words and the vertical parity bit is a ninth bit. During the transfer of data, each character that is being written on tape deck 607 is also applied to a cyclic redundancy character unit 626. After an entire block of data is written, a nine bit character remains in cyclic redundancy character unit 226. This nine bit character, which is unique to the block of data just transferred, is written onto tape deck 607 four character spaces after the block of data has been written. After the block of data has been written, vertical and longitudinal parity generator 624 contains a longitudinal parity for each track in the block of data. After the nine bit character has been written, the longitudinal parity is written on tape deck 607 four character spaces after the nine bit character. A decoder 628, which receives data signals from tape deck 607, generates a data signal that is applied to computer 60 as an indication that tape deck 607 has been properly set up. If tape deck 607 is not properly set up, decoder 628 generates an error flag that is applied to computer 60. An oscillator 630 generates a clock for timing read/write control 612. A cassette recorder 76 is provided also for long time storage.

The computer controlled high resolution radioactivity distribution detection system embodying the invention has a sample rate in the order of 0.05 second which is particularly useful in angiography. The method for determining the condition of a patient's heart includes the steps of injecting a bolus of a concentrated radioactive sample into the patient, detecting the volume of blood flowing through the heart by sensing the radioactivity of the sample as it passes through the heart, processing the sensed data, and presenting the processed data. First, a 0.1cc to 0.2cc bolus of a concentrated radioactive sample is injected into a vein in the patient's arm. The bolus, which remains substantially in tact as it passes through the heart, has a particular portion of maximum radioactivity concentration. As the bolus passes through the different chambers of the heart, the radioactivity is sensed by detector assembly 12 and is processed in processing electronics 14. The detected events are accumulated to events having the same address and temporarily stored as raw data in buffer memory 68. The raw data is transferred to disc 162 via computer 60 and disc interface 160. The data is transferred out of buffer memory 68 so that it will be ready to accept new data. Next, the raw data is removed from disc 162 and fed to computer 60 for further processing. next, a raw data curve of the raw data is generated by the computer. Next, a smooth data curve representing the raw data curve is generated by computer 60. Next, zero crossings of the smooth data curve is searched to find a primary curve denoted by the maximum number of detected events. Next, the first derivative of the primary curve is determined for finding the point of maximum positive and negative slopes of the smooth data curve. The maximum slope on the rising side of the primary curve indicates maximum concentration of the sample entering a heart chamber and the maximum slope on the falling side of the primary curve indicates maximum concentration of the sample leaving the heart chamber. Next, the address of the maximum positive slope on the smooth curve is located on the corresponding address of the raw data curve. Next, the raw data points above and below the point of maximum positive slope are noted. Next, these three points are linearly extrapolated to the raw data curve base line. Next, the address of the maximum negative slope on the smooth curve is located on the corresponding address of the raw data curve. Next, the raw data points above and below the point of maximum negative slope are noted. Next, these three points are exponentially extrapolated to the raw data curve base line. Next, the area under the curve is determined for finding the centroid of the curve which is the mean transit time or volume divided by flow. Then, the primary curve is subtracted from the raw data curve and the process continues with respect to finding the mean transit time for the secondary curve. The foregoing method provides data, which is presented on the display and indicates the condition of the patient's heart.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A high resolution radioactivity distribution detection system for determining the condition of a subject under diagnosis, the subject containing a diagnostic dose of a radioactive substance, said system comprising:
   a. an array of sensors for detecting radioactive events within the subject, each said sensor having a unique address location within the array representing a unique spatial segment of the subject, each said sensor generating a light signal when activated by a radioactive event;
   b. a plurality of photo detecting devices optically coupled to said array, unique combinations of said photo detecting devices uniquely identifying said address locations of said sensors, each one of said combinations uniquely identifying one of each said address locations of said sensors, said photo detecting devices converting said light signals generated by said sensors into current signals;
c. front-end electronics means connected to said photo detecting devices, said front-end electronics means digitizing said current signals into data signals constituting the amplitude of said sensed radioactive events and said address location of said sensed events;
d. buffer memory means connected to said front-end electronics means for temporarily storing said data signals, said buffer memory means having address locations corresponding to said address locations of said sensors in said array, said data signals representing said sensed events temporarily stored in said buffer memory means at said corresponding address locations, said data signals representing said sensed events at any one address location accumulated to data signals representing said sensed events at the same address location in said buffer memory means;
e. a general purpose computer connected to said buffer memory means;
f. a disc interface connected to said computer
g. a disc memory means connected to said disc interface, said disc memory means including a disc for storing data signals and a head for writing said data signals onto said disc and for reading said data signals from said head, said disc storing also instructional data for control of said computer, said disc interface configured to transfer data from said computer to said disc memory and to transfer data from said disc memory to said computer; and
h. display means connected to said computer means for presenting said data stored in said disc memory, said display means controlled by said computer;
i. said computer generating command signals which are applied to said buffer memory means for transferring said data stored in said buffer memory means to said disc memory, said data sequentially transferred from said buffer memory means to said computer, then to said disc interface and finally to said disc memory;
j. said computer generating command for transferring said data stored in said disc memory to said display means for presentation, said data sequentially transferred from said disc memory to said disc interface, then to said computer and finally to said display means.

2. The system as claimed in claim 1 wherein said disc includes a plurality of tracks, each said track having a plurality of sectors, sectors on one track rotated on half a revolution from sectors on adjacent tracks.

3. The system as claimed in claim 2 wherein said disc memory includes:
a. a track selector connected to said computer, said track selector generating track position signals for moving said head to a designated track on said disc in response to control signals generated by said computer;
b. a sector selector connected to said computer, said sector selector generating sector signals for moving said read to a designated sector of said designated track in response to control signals generated by said computer; and
c. means for reading data from said disc and for writing data onto said disc, said means for reading and writing connected to said computer.

4. The system as claimed in claim 3 wherein said means for reading and writing includes:
a. a computer address connected to said computer for generating a control signal indicating where in said computer the data to be transferred is located;
b. a word length selector connected to said computer for generating a control signal representing the number of data words to be transferred; and
c. a control logic connected to said word length selector for generating a control signal indicating a read function and a write function.

5. The system as claimed in claim 3 wherein said disc memory includes:
a. dual buffer means connected to said computer for storing data words; and
b. a parallel/serial/parallel converter connected to said dual buffer means and said disc interface;
c. said data words stored in said dual buffer means applied in parallel to said parallel/serial/parallel converter for conversion to serial data, said dual buffer means storing two words of data and said parallel/serial/parallel converter storing one word of data, said serial data generated by said parallel/serial/parallel converter applied to said disc interface.

6. The system as claimed in claim 2 wherein said disc memory includes:
a. a track selector connected to said computer, said track selector generating track position signals for moving said head to a designated track on said disc in response to control signals generated by said computer;
b. a sector selector connected to said computer, said sector selector generating sector signals for moving said read to a designated sector of said designated track in response to control signals generated by said computer;
c. a computer address connected to said computer for generating a control signal indicating where in said computer the data to be transferred is located;
d. a word length selector connected to said computer for generating a control signal representing the number of data words to be transferred;
e. a control logic connected to said word length selector for generating a control signal indicating a read function and a write function;
f. dual buffer means connected to said computer for storing data words; and
g. a parallel/serial/parallel converter connected to said dual buffer means and said disc interface;
h. said data words stored in said dual buffer means applied in parallel to said parallel/serial/parallel converter for conversion to serial data, said dual buffer means storing two words of data and said parallel/serial/parallel converter storing one word of data, said serial data generated by said parallel/serial/parallel converter applied to said disc interface.

7. The system as claimed in claim 6 wherein said disc interface includes:
a. a separator for converting read data into data signals that are readable onto said disc, said separator connected to said control logic and said computer;
b. a formator for generating data signals identifying a particular track and sector on said disc, said formator connected to said sector selector and said disc memory; and c. a converter connected to said disc memory, said computer and said control logic for generating data signals indicating that said head is in proper position relative to said disc.

8. The system as claimed in claim 7 wherein said disc interface includes a preamble and postamble generator for generating data signals indicating where data is to be read and written relative to said sectors on said tracks, said preamble and postamble generator connected to said control logic and said disc memory.

9. The system as claimed in claim 8 wherein said disc interface includes:
   a. an error buffer connected to said computer and said disc memory for generating data signals which indicate that said disc memory is operating properly; and
   b. a write clock generator connected to said parallel/serial/parallel converter and said disc memory for generating clock signals defining the rate at which data is to be written onto said disc.

* * * * *